(12) United States Patent
Shin (10) Patent No.: US 12,496,929 B2
(45) Date of Patent: Dec. 16, 2025

(54) SYSTEM AND METHOD FOR DISCHARGE ENERGY MANAGEMENT OF SPECIAL-PURPOSE ELECTRIC VEHICLE

(71) Applicants: Hyundai Motor Company, Seoul (KR); Kia Corporation, Seoul (KR)

(72) Inventor: Myung Kyun Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 191 days.

(21) Appl. No.: 18/468,178

(22) Filed: Sep. 15, 2023

(65) Prior Publication Data
US 2024/0424947 A1    Dec. 26, 2024

(30) Foreign Application Priority Data
Jun. 21, 2023 (KR) .......................... 10-2023-0079355

(51) Int. Cl.
| | |
|---|---|
| *B60L 58/12* | (2019.01) |
| *B60L 3/12* | (2006.01) |
| *B60P 3/20* | (2006.01) |

(52) U.S. Cl.
CPC ............. *B60L 58/12* (2019.02); *B60L 3/12* (2013.01); *B60L 2240/62* (2013.01); *B60L 2240/72* (2013.01); *B60L 2250/16* (2013.01); *B60L 2260/52* (2013.01); *B60L 2260/54* (2013.01); *B60P 3/20* (2013.01)

(58) Field of Classification Search
CPC ........ B60L 58/12; B60L 3/12; B60L 2240/62; B60L 2240/72; B60L 2250/16; B60L 2260/52; B60L 2260/54; B60L 1/02; B60L 2240/34; B60L 2240/622; B60L 1/003; B60L 2240/80; B60L 2240/60; B60L 2250/10; B60P 3/20; G01C 21/3679; G01C 21/3697; B60Y 2200/91; Y02T 10/7072; Y02T 10/72
See application file for complete search history.

(56) References Cited

U.S. PATENT DOCUMENTS 5,790,976 A  *  8/1998  Boll ...................... H02J 7/0048
                                                                 701/25
2019/0118709 A1*  4/2019  Qiu .................... G06K 7/10366

* cited by examiner

*Primary Examiner* — Alan D Hutchinson
(74) *Attorney, Agent, or Firm* — SLATER MATSIL, LLP (57) ABSTRACT

An embodiment system for discharge energy management of an electric vehicle includes a navigation device configured to receive an input that includes a destination and a parking/stopping time of the electric vehicle, a controller configured to calculate a driving energy required for driving the electric vehicle to the destination and a first required energy for maintaining a refrigerating or freezing function to the destination and to determine in advance, based on a current battery state of charge (SOC) level, whether it is possible for the electric vehicle to be driven to the destination while consuming a total energy obtained by summing the driving energy and the first required energy, and a display device configured to display a result of the determination of whether it is possible for the electric vehicle to be driven to the destination while consuming the total energy.

15 Claims, 3 Drawing Sheets

SYSTEM AND METHOD FOR DISCHARGE ENERGY MANAGEMENT OF SPECIAL-PURPOSE ELECTRIC VEHICLE

CROSS-REFERENCE TO RELATED APPLICATIONS

This application claims the benefit of Korean Patent Application No. 10-2023-0079355, filed on Jun. 21, 2023, which application is hereby incorporated herein by reference.

TECHNICAL FIELD

The present disclosure relates to a system and a method for discharge energy management of a special-purpose electric vehicle.

BACKGROUND

As the size of the delivery market for delivering various goods and the size of the market for electric vehicles increase together, a need for a special-purpose electric vehicle having a refrigerating or freezing function continues to increase.

In particular, unlike an internal combustion engine vehicle, the special-purpose electric vehicle having a refrigerating or freezing function may provide an advantage of maintaining the refrigerating or freezing function by driving an electric compressor using discharged energy from a battery even when the vehicle is parked/stopped with the ignition turned off.

However, a conventional special-purpose electric vehicle having a refrigerating or freezing function determines whether it is possible to maintain the refrigerating or freezing function not considering driving conditions (for example, ignition off, parking/stopping time, and the like) to a destination, driving energy required to the destination, energy required for refrigerating or freezing, and the like but only considering a battery state of charge (SOC) indicating a current remaining amount of charge of the battery. Accordingly, there may be a problem that the existing special-purpose electric vehicle may lose a refrigerating or freezing function when the vehicle is parked/stopped depending on the battery SOC.

For example, when the battery SOC is below a reference value, the conventional special-purpose electric vehicle having the refrigerating or freezing function determines that the battery SOC is insufficient for maintaining the refrigerating or freezing function besides achieving the purpose of driving the vehicle to the destination, thereby limiting the battery discharge energy provided to the parts performing the refrigerating or freezing function. Accordingly, a problem may be caused such that the conventional special-purpose electric vehicle may not be able to use the refrigerating or freezing function.

In addition, when the conventional special-purpose electric vehicle having the refrigerating or freezing function is driven to the destination, it is not possible for a driver to accurately recognize whether it is possible for the vehicle to easily reach the destination while consuming even the battery discharge energy required for maintaining the refrigerating function in addition to the battery discharge energy required for driving the vehicle to the destination at the current battery SOC level.

Therefore, the anxiety of a driver who is worrying about complete discharge of the battery may be created, and accordingly, there is a problem in that the driver has no choice but to conservatively operate the refrigerating or freezing function, such as temporarily turning off the refrigerating or freezing function.

The foregoing is intended merely to aid in the understanding of the background of embodiments of the present disclosure and is not intended to mean that embodiments of the present disclosure fall within the purview of the related art that is already known to those skilled in the art.

SUMMARY

The present disclosure relates to a system and a method for discharge energy management of a special-purpose electric vehicle. Particular embodiments relate to a system and a method for discharge energy management of a special-purpose electric vehicle capable of appropriately managing discharged energy from a battery of a special-purpose electric vehicle having a refrigerating or freezing function in consideration of a driving destination and driving conditions.

Accordingly, embodiments of the present disclosure have been made keeping in mind problems occurring in the related art, and embodiments of the present disclosure provide a system and a method for discharge energy management of a special-purpose electric vehicle, wherein the system and the method calculate driving energy required for driving the vehicle to the destination and first required energy for maintaining a refrigerating or freezing function to the destination and determine in advance whether it is possible to drive the vehicle to the destination while consuming the driving energy and the first required energy at the current battery SOC level to inform the driver, thereby stably inducing the vehicle to be able to be driven to the destination while maintaining the use of the refrigerating or freezing function.

In addition, embodiments of the present disclosure provide a system and a method for discharge energy management of a special-purpose electric vehicle, wherein, when the vehicle is to be parked/stopped for a certain period of time while being driven to the destination, the system and the method may calculate the second required energy for maintaining the refrigerating or freezing function when the vehicle is parked/stopped and determine an available parking/stopping time while consuming the second required energy at the current battery SOC level to inform the driver, thereby stably inducing the vehicle to be able to be driven to the destination while maintaining the use of the refrigerating or freezing function.

According to one embodiment of the present disclosure, there may be provided a system for discharge energy management of a special-purpose electric vehicle including a navigation device for inputting a destination and a parking/stopping time of the vehicle, a controller configured to calculate driving energy required for driving the vehicle to the destination and first required energy for maintaining a refrigerating or freezing function to the destination and to determine in advance, at a current battery SOC level, whether it is possible for the vehicle to be driven to the destination while consuming the driving energy and the first required energy, and a display device configured to display whether it is possible for the vehicle to be driven to the destination including total energy obtained by summing the driving energy and the first required energy by a command of the controller so as to be recognized by a driver.

When it is determined that it is not possible for the vehicle to be driven to the destination while consuming the driving energy and the first required energy, the controller may be configured to perform control for displaying a battery discharge energy limit warning on the display device and, in order to induce charging of a battery at the same time, for displaying a charging station on the navigation device.

In addition, when it is determined that it is possible for the vehicle to be driven to the destination while consuming the driving energy and the first required energy, the controller may be configured to perform control for displaying a message informing that it is possible for the vehicle to be driven to the destination at the current battery SOC level on the display device.

Specifically, the controller may be configured to control for calculating the second required energy required for maintaining the refrigerating or freezing function in a state of the vehicle being parked/stopped during the input parking/stopping time input through the navigation device and for determining the available parking/stopping time for which the vehicle is able to be parked/stopped while discharging the second required energy on the basis of the current battery SOC level, thereby displaying the available parking/stopping time on the display device.

In addition, the controller may be configured to compare the input parking/stopping time with the available parking/stopping time and, when the input parking/stopping time is greater, to output a command to re-input the parking/stopping time as a value no greater than the available parking/stopping time to the display device.

In addition, the controller may be configured to compare the input parking/stopping time with the available parking/stopping time and, when the available parking/stopping time is greater, to output a message indicating that parking/stopping is possible during the input parking/stopping time to the display device.

In addition, when the actual parking/stopping time exceeds the above available parking/stopping time, the controller may be configured to output a warning message indicating that a battery SOC may fall below the lower limit reference value to the display device.

The display device may include a display mounted inside the vehicle and a smart device owned by the driver.

According to another embodiment of the present disclosure, there may be provided a method for discharge energy management of a special-purpose electric vehicle including, in the controller, confirming that a destination and a parking/stopping time of the vehicle are input to a navigation device, in the controller, calculating driving energy required for driving the vehicle to the destination and first required energy for maintaining a refrigerating or freezing function to the destination and determining, at a current battery SOC level, whether it is possible for the vehicle to be driven to the destination while consuming total energy obtained by summing the driving energy and the first required energy, and in the controller, controlling to display whether it is possible for the vehicle to be driven to the destination including the total energy that is obtained by summing the driving energy and the first required energy on the display device so as to be recognized by a driver.

In addition, when it is determined that it is not possible for the vehicle to be driven to the destination while consuming the driving energy and the first required energy, a battery discharge energy limit warning may be displayed on the display device, and at the same time, displaying a charging station on the navigation device may be further performed in order to induce charging of the battery, by the control of the controller.

In addition, when it is determined that it is possible for the vehicle to be driven to the destination while consuming the driving energy and the first required energy, displaying a message informing that it is possible for the vehicle to be driven to the destination at the current battery SOC level on the display device may be further performed, by the control of the controller.

Specifically, when the parking/stopping time is input through the navigation device in a state of the vehicle being parked/stopped, the method may further include, in the controller, calculating second required energy required for maintaining the refrigerating or freezing function during an input parking/stopping time input through the navigation device, in the controller, determining an available parking/stopping time for which parking/stopping is possible while discharging the second required energy on the basis of the current battery SOC level, and in the controller, controlling a determined available parking/stopping time to be displayed on the display device.

In addition, in the controller, the input parking/stopping time may be compared with the available parking/stopping time, and when the input parking/stopping time is greater, a command to re-input the parking/stopping time as a value no greater than the available parking/stopping time may be output to the display device.

In addition, in the controller, the input parking/stopping time may be compared with the available parking/stopping time, and when the available parking/stopping time is greater, a message indicating that the input parking/stopping time is appropriate may be output to the display device.

In addition, when an actual parking/stopping time exceeds an available parking/stopping time, in the controller, a warning message indicating that a battery SOC may fall below a lower limit reference value may be output to the display device.

As described above, through the above-described features, embodiments of the present disclosure provide effects as follows.

First, when a destination of a special-purpose electric vehicle having a refrigerating or freezing function is input, embodiments of the present disclosure can calculate driving energy required for driving the vehicle to the destination and the first required energy for maintaining a refrigerating or freezing function to the destination and determine whether it is possible to drive the vehicle to the destination while consuming the driving energy and the first required energy at the current battery SOC level to inform the driver in advance, thereby stably inducing the vehicle to be able to be driven to the destination while maintaining the use of the refrigerating or freezing function.

Second, a driver can accurately recognize whether it is possible to easily reach the destination while consuming even the battery discharge energy required for maintaining the refrigerating or freezing function in addition to the battery discharge energy required for driving the vehicle to the destination at the current battery SOC level, thereby preventing the driver from worrying about the complete discharge of the battery and inducing the driver to drive stably.

Third, when the vehicle is to be parked/stopped for a certain period of time while being driven to the destination, embodiments of the present disclosure can calculate the second required energy for maintaining the refrigerating or freezing function when the vehicle is parked/stopped and determine an actually available parking/stopping time while consuming the second required energy at the current battery SOC level to inform the driver in advance so as to allow the driver to accurately recognize the actually available parking/stopping time, thereby preventing the driver from worrying about the complete discharge of the battery due to the parking/stopping time and stably inducing the vehicle to be able to be driven to the destination while maintaining the use of the refrigerating or freezing function.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Specific structural to functional descriptions described in the exemplary embodiments of the present specification are merely exemplified for the purpose of explaining embodiments according to a concept of embodiments of the present disclosure, and the embodiments according to the concept of embodiments of the present disclosure may be implemented in various forms. In addition, the embodiments of the invention should not be construed to be limited by the embodiments described in the present specification and should be understood to include all modifications, equivalents, or substitutes included in the spirit and technical scope thereof.

Meanwhile, in embodiments of the present disclosure, terms such as first and/or second may be used to describe various components, but the components are not limited by the terms. The above terms are used only for the purpose of distinguishing one component from other components, and for example, within a range not departing from the scope of rights according to the concept of embodiments of the present disclosure, a first component may be referred to as a second component, and similarly, the second component may also be referred to as the first component.

It should be understood that when a component is referred to as being "coupled" or "connected" to another component, it may be directly coupled or connected to another component, but other components may even exist in the middle. On the other hand, when a component is referred to as being "directly coupled" or "directly connected" to another component, it should be understood that no other component exists in the middle. Other expressions used to describe the relationship between each component, such as "between" and "directly between" or "adjacent to" and "directly adjacent to," should be interpreted similarly.

Like reference numbers indicate like elements throughout the specification. Terms used in the present specification are for describing the embodiments and are not intended to limit the present disclosure. In the present specification, a singular form also includes a plural form unless specifically stated in a phrase. As used herein, "comprises" and/or "comprising" implies that a stated component, step, operation, and/or element does not rule out the presence or addition of one or more other components, steps, operations, and/or elements.

Hereinbelow, exemplary embodiments of the present disclosure will be described in detail with reference to the accompanying drawings.

Figure 1:
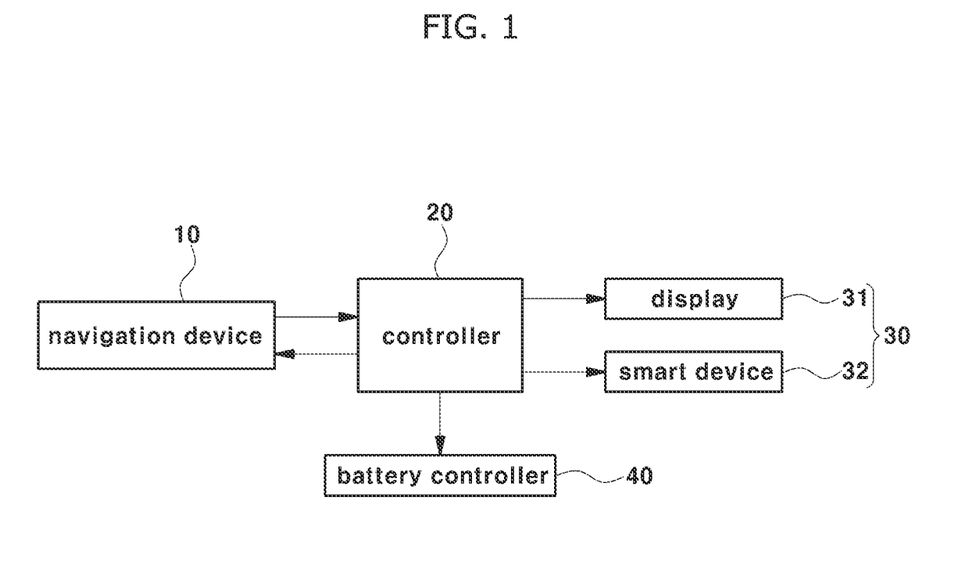
FIG. 1 is a control configuration diagram showing a system for discharge energy management of a special-purpose electric vehicle according to embodiments of the present disclosure.
Figure 2:
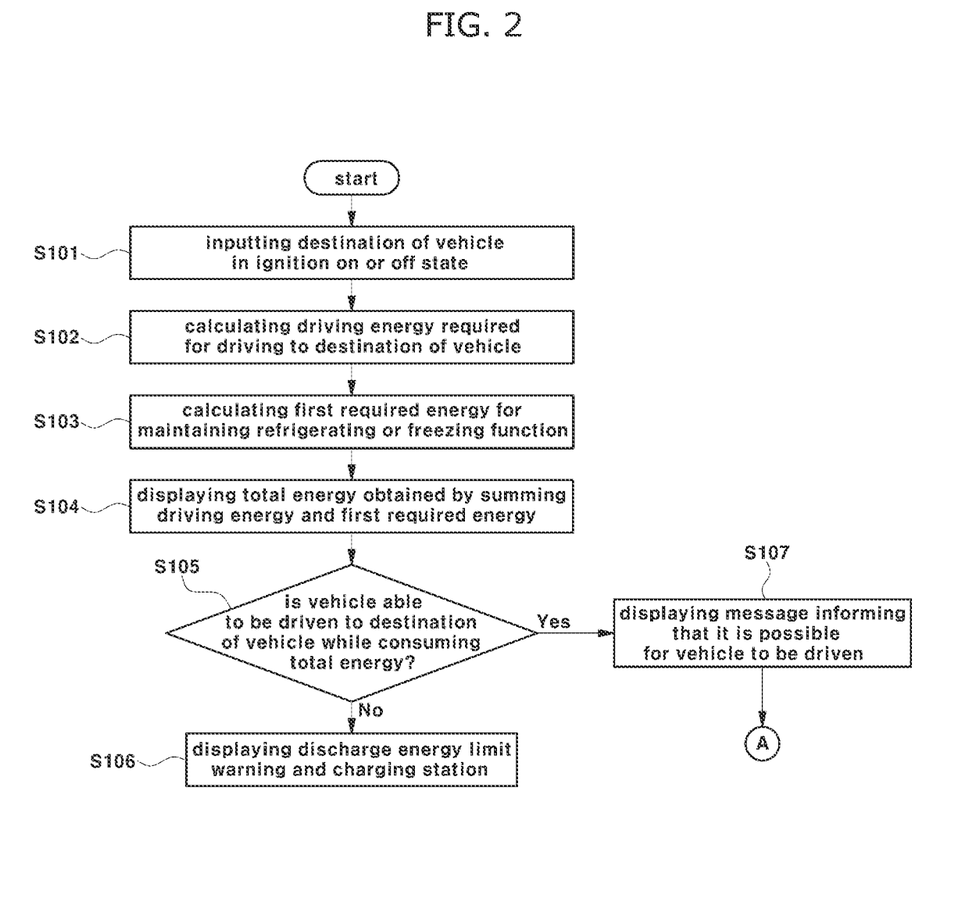
FIGS. 2 and 3 are flowcharts each showing a method for discharge energy management of a special-purpose electric vehicle according to embodiments of the present disclosure.
Figure 3:
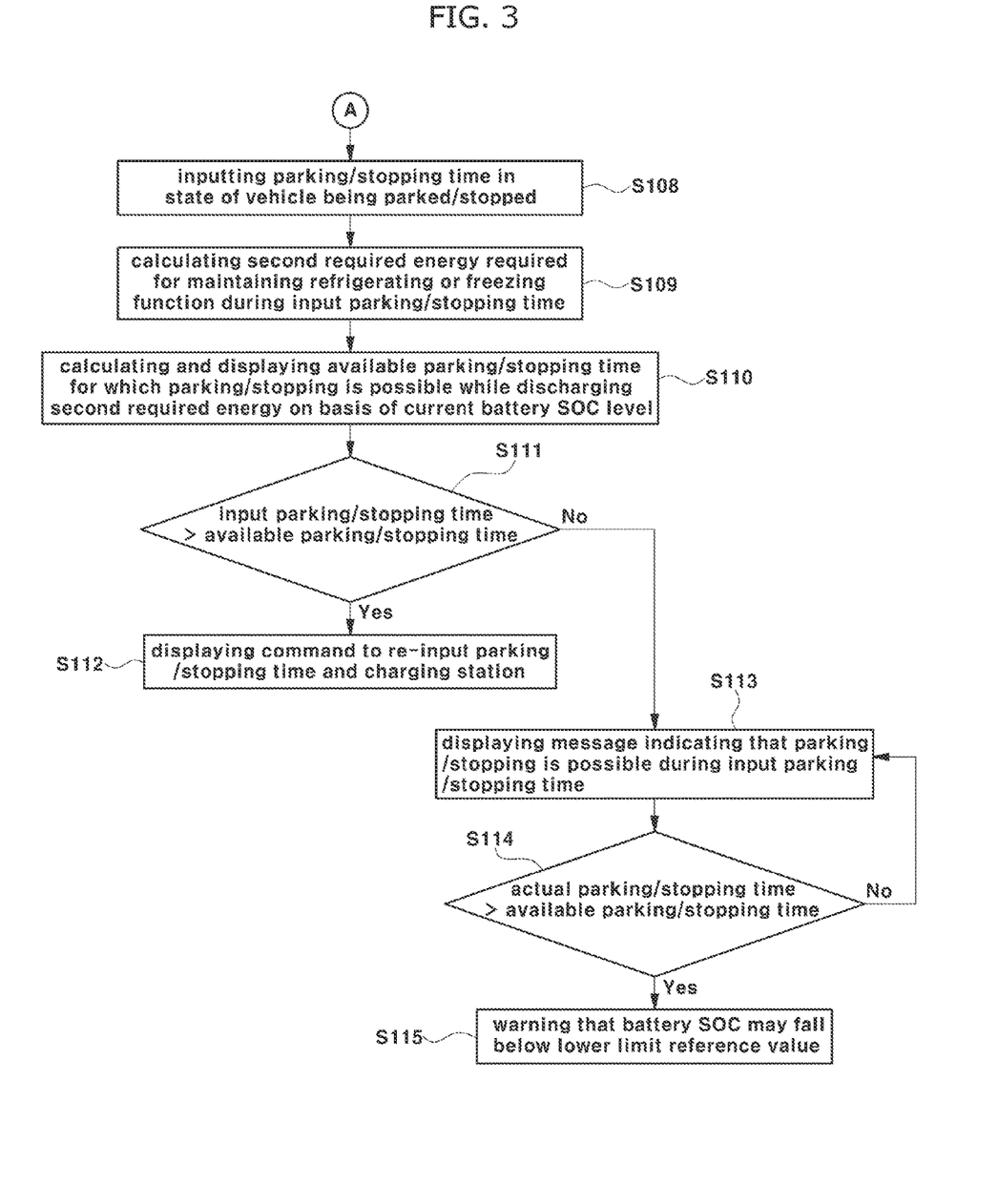

FIG. 1 is a control configuration diagram showing a system for discharge energy management of a special-purpose electric vehicle according to embodiments of the present disclosure, and FIGS. 2 and 3 are flowcharts each showing a method for discharge energy management of a special-purpose electric vehicle according to embodiments of the present disclosure.

One focus of embodiments of the present disclosure is on calculating driving energy required for driving the vehicle to a destination, first required energy for maintaining a refrigerating or freezing function to the destination, and second required energy for maintaining the refrigerating or freezing function when the vehicle is parked/stopped and determining whether it is possible to drive the vehicle to the destination while consuming the driving energy, the first required energy, and the second required energy at the current battery SOC level, thereby stably inducing the vehicle to be able to be driven to the destination while maintaining the use of the refrigerating or freezing function.

To this end, as shown in FIG. 1, the system for discharge energy management of a special-purpose electric vehicle according to embodiments of the present disclosure includes a navigation device 10 for inputting a destination and a parking/stopping time of the vehicle, a controller 20 configured to calculate the driving energy required for driving the vehicle to the input destination and the first required energy for maintaining the refrigerating or freezing function to the input destination and to determine in advance whether it is possible for the vehicle to be driven to the destination while consuming the driving energy and the first required energy at the current battery SOC level, and a display device 30 configured to display whether it is possible for the vehicle to be driven to the destination including total energy obtained by summing the driving energy and the first required energy by a command of the controller 20 so as to be recognized by a driver.

The controller 20 is an upper controller and is configured to receive current battery SOC information from a battery controller 40 which is a lower controller.

The display device 30 may include a display 31 for a cluster mounted inside the vehicle and a smart device 32 such as a smartphone and the like owned by a driver.

On the other hand, the driving energy required for driving the vehicle to the destination is the discharge energy of the battery discharged to a driving motor of the electric vehicle and may be determined as a value obtained by subtracting the margin energy consumed by using an air conditioner and the like from the available energy of the battery used when calculating a distance to empty (DTE) reflecting a destination.

In addition, the first required energy may be energy consumed by a compressor driven to maintain a refrigerating or freezing function to the destination.

When it is determined, after calculating the driving energy required for driving the vehicle to the destination input through the navigation device 10 and the first required energy for maintaining the refrigerating or freezing function to the input destination, that it is not possible for the vehicle to be driven to the destination while consuming the calculated driving energy required for driving the vehicle to the destination input through the navigation device 10 and the first required energy for maintaining the refrigerating or freezing function to the input destination, the controller 20 is configured to perform control for displaying a battery discharge energy limit warning on the display 31 and the smart device 32, each of which is the display device 30 and, at the same time, for displaying a charging station on the navigation device in order to induce charging of a battery.

Accordingly, the driver may recognize that it is possible for the vehicle to be driven to the destination at the current battery SOC level, and it is impossible, however, to maintain the refrigerating or freezing function for the items inside the load box. Accordingly, the driver may be induced to stop by an electric vehicle charging station to recharge the battery while driving the vehicle to the destination.

When it is determined that it is possible for the vehicle to be driven to the destination while consuming the driving energy and the first required energy, the controller 20 is configured to perform control for displaying a message informing that it is possible for the vehicle to be driven to the destination on the display 31 and the smart device 32, each of which is the display device 30 at the current battery SOC level.

Accordingly, the driver is able to accurately recognize whether it is possible for the vehicle to easily arrive at the destination while consuming even the battery discharge energy required for maintaining the refrigerating or freezing function in addition to the battery discharge energy required for driving the vehicle to the destination at the current battery SOC level. Accordingly, the anxiety of a driver who is worrying about the complete discharge of the battery may be prevented, and stable driving may be induced.

When the vehicle is to be parked/stopped for a certain period of time while being driven to the destination, embodiments of the present disclosure may calculate the second required energy for maintaining the refrigerating or freezing function when the vehicle is parked/stopped and determine a duration in which the vehicle may be parked/stopped while consuming the second required energy at the current battery SOC level to inform the driver. Accordingly, another focus of embodiments of the present disclosure is on one aspect in that the driver is able to be stably induced to drive the vehicle while maintaining the use of the refrigerating or freezing function to the vehicle's destination.

To this end, the controller 20 is configured to control for calculating the second required energy required for maintaining the refrigerating or freezing function in a state of the vehicle being parked/stopped during the input parking/stopping time input through the navigation device 10 and for determining the available parking/stopping time for which the vehicle may be parked/stopped while discharging the second required energy on the basis of the current battery SOC level, thereby displaying the available parking/stopping time on the display 31 and the smart device 32, each of which is the display device 30.

At this time, in an ignition off state, when a utility mode, which refers to a mode in which battery power is used in an external device for camping, is used, the controller 20 recognizes the vehicle as is in the parking/stopping state when the vehicle is in stage P.

In addition, the controller 20 is configured to perform control for comparing the input parking/stopping time input through the navigation device 10 with the available parking/stopping time for which the vehicle is able to be parked/stopped while discharging the second required energy on the basis of the current battery SOC level and, when the input parking/stopping time is greater, for displaying a command to re-input the parking/stopping time as a value no greater than the available parking/stopping time on the display 31 and the smart device 32, each of which is the display device 30.

On the other hand, the controller 20 is configured to perform control for comparing the input parking/stopping time input through the navigation device 10 with the available parking/stopping time for which the vehicle is able to be parked/stopped while discharging the second required energy on the basis of the current battery SOC level and, when the available parking/stopping time is greater, for displaying a message indicating that parking/stopping is possible during the input parking/stopping time on the display 31 and the smart device 32, each of which is the display device 30.

Accordingly, when the driver wants to park/stop the vehicle at a service area and the like for a certain period of time while driving to the destination, the driver is able to clearly recognize the actual parking/stopping time capable of maintaining the refrigerating or freezing function for the internal items of the load box, and accordingly, the anxiety of a driver who is worrying about the complete discharge of the battery due to the parking/stopping time may be prevented.

On the other hand, when the actual parking/stopping time exceeds the above available parking/stopping time, the controller 20 is configured to perform control for displaying a warning message indicating that the battery SOC may fall below the lower limit reference value as the second required energy for maintaining the refrigerating or freezing function is continuously consumed on the display 31 and the smart device 32, each of which is the display device 30, thereby allowing the driver to recognize that the vehicle needs to immediately start without further parking/stopping.

Here, a method for discharge energy management of a special-purpose electric vehicle according to embodiments of the present disclosure based on the above control configuration is sequentially described as follows with reference to FIGS. 2 and 3.

First, in the ignition on or off state, the driver inputs a destination through a navigation device 10 in S101.

Accordingly, after confirming that the destination is input through the navigation device 10, the controller 20 calculates the driving energy required for driving the vehicle to the vehicle's destination in S102.

The driving energy is the discharge energy of the battery discharged to a driving motor of the electric vehicle and may be determined as a value obtained by subtracting the margin energy consumed by using an air conditioner and the like from the available energy of the battery used when calculating a distance to empty (DTE) reflecting the destination.

Subsequently, the controller 20 calculates the first required energy for maintaining the refrigerating or freezing function to the destination in S103.

The first required energy may be the energy consumed by a compressor driven to maintain a refrigerating or freezing function to the destination.

At this time, the total energy obtained by summing the driving energy and the first required energy may be displayed on the display device 30 by the control of the controller 20 in S104.

Next, the controller 20 determines whether it is possible for the vehicle to be driven to the destination while consuming the total energy obtained by summing the driving energy and the first required energy at the current battery SOC level in S105.

More specifically, the controller 20 is configured to control for displaying the total energy obtained by summing the driving energy and the first required energy on the display 31 and the smart device 32, each of which is the display device 30 and, at the same time, for displaying a result of the determination of whether it is possible for the vehicle to be driven to the destination while consuming the total energy obtained by summing the driving energy and the first required energy at the current battery SOC level on the display 31 and the smart device 32, each of which is the display device 30, so as to be recognized by the driver.

When it is determined in step S105 above that it is not possible for the vehicle to be driven to the destination while consuming the total energy obtained by summing the calculated driving energy and the first required energy, then by the control of the controller 20, a battery discharge energy limit warning is displayed on the display 31 and the smart device 32, each of which is the display device 30, and at the same time, a step of displaying a charging station on the screen of the navigation device 10 is performed in order to induce charging of the battery in S106.

Accordingly, the driver may recognize that it is possible to drive to the destination at the current battery SOC level, but it is impossible to maintain the refrigerating or freezing function for the items inside the load box. Accordingly, the driver may be induced to stop by an electric vehicle charging station to recharge the battery while driving the vehicle to the destination.

On the other hand, when it is determined in step S105 above that it is possible for the vehicle to be driven to the destination while consuming the driving energy and the first required energy, by the control of the controller 20, a step of displaying a message informing that it is possible for the vehicle to be driven to the destination at the current battery SOC level on the display 31 and the smart device 32, each of which is the display device 30, is performed in S107.

Accordingly, the driver is able to accurately recognize through message information displayed on the display 31 and the smart device 32 whether the vehicle may easily arrive at the destination while consuming even the battery discharge energy required for maintaining the refrigerating or freezing function in addition to the battery discharge energy required for driving the vehicle to the destination at the current battery SOC level. Accordingly, the anxiety of a driver who is worrying about the complete discharge of the battery may be prevented and stable driving may be induced.

On the other hand, when it is determined in S105 that it is possible for the vehicle to be driven to the destination while consuming the driving energy and the first required energy, a step of displaying a message informing that it is possible for the vehicle to be driven to the destination at the current battery SOC level on the display device is performed, by the control of the controller in S107.

Accordingly, the driver is able to accurately recognize through message information displayed on the display 31 and the smart device 32 whether it is possible for the vehicle to easily arrive at the destination while consuming even the battery discharge energy required for maintaining the refrigerating or freezing function in addition to the battery discharge energy required for driving the vehicle to the destination at the current battery SOC level. Accordingly, the anxiety of a driver who is worrying about the complete discharge of the battery may be prevented, and stable driving may be induced.

Meanwhile, when the vehicle is to be parked/stopped for a certain period of time while being driven to the destination, the driver inputs the parking/stopping time through the navigation device 10 in a state in which the vehicle is parked/stopped in S108.

At this time, in an ignition off state, when a utility mode, which refers to a mode in which battery power is used in an external device for camping, is used, the controller 20 recognizes the vehicle as being in the parking/stopping state when the vehicle is in stage P and may receive the parking/stopping time input from the navigation device 10.

Subsequently, the controller 20 calculates the second required energy required for maintaining the refrigerating or freezing function during the input parking/stopping time input through the navigation device 10 in the state of the vehicle being parked/stopped in S109.

The second required energy may be energy consumed by a compressor and the like driven to maintain a refrigerating or freezing function during parking/stopping time.

Subsequently, the controller 20 is configured to perform control that determines the available parking/stopping time for which the vehicle is able to be parked/stopped while discharging the second required energy on the basis of the current battery SOC level, thereby displaying the available parking/stopping time on the display 31 and the smart device 32, each of which is the display device 30 in S110.

Accordingly, the driver may recognize the available parking/stopping time for maintaining the refrigerating or freezing function through the screen of the display 31 and the smart device 32.

Subsequently, the controller 20 is configured to perform control for comparing the input parking/stopping time with the available parking/stopping time in S111 and, when the input parking/stopping time is greater, for displaying a command to re-input the parking/stopping time as a value no greater than the available parking/stopping time on the display 31 and the smart device 32, each of which is the display device 30 in S112.

Accordingly, the driver may re-input the desired parking/stopping time within the available parking/stopping time for maintaining the refrigerating or freezing function.

On the other hand, the controller 20 is configured to perform control for comparing the input parking/stopping time with the available parking/stopping time and, when the available parking/stopping time is greater, for displaying a message indicating that parking/stopping is possible during the input parking/stopping time on the display 31 and the smart device 32, each of which is the display device 30 in S113.

Accordingly, the driver may look at the message displayed on the display device 30 and recognize that the refrigerating or freezing function may be maintained during the parking/stopping time input thereby.

Meanwhile, when the vehicle is parked/stopped, the controller 20 is configured to perform control for comparing the actual parking/stopping time with the available parking/stopping time in S114 and, when the input parking/stopping time exceeds the available parking/stopping time, for displaying a warning message indicating that the battery SOC may fall below the lower limit reference value on the display 31 and the smart device 32, each of which is the display device 30 in S115.

Accordingly, the driver may recognize that the actual parking/stopping time exceeds the available parking/stopping time through the warning message, thereby being induced to start the vehicle toward the destination.

As such, when the vehicle is to be parked/stopped for a certain period of time while being driven to the destination, embodiments of the present disclosure may calculate the second required energy for maintaining the refrigerating or freezing function when the vehicle is parked/stopped and determine an actually available parking/stopping time while consuming the second required energy at the current battery SOC level to inform the driver in advance so as to allow the driver to accurately recognize the actually available parking/ stopping time, thereby preventing the driver from worrying about the complete discharge of the battery due to the parking/stopping time and stably inducing the vehicle to be able to be driven to the destination while maintaining the use of the refrigerating or freezing function.

Although embodiments of the present disclosure have been described in detail with various embodiments above, the scope of the embodiments of the present disclosure is not limited to the above-described embodiments, and it should be understood that various modifications and improvements of those skilled in the art using the basic concept of embodiments of the present disclosure defined in the following claims will also be included in the scope of the right of the embodiments of the present disclosure.

What is claimed is:

1. A system for discharge energy management of an electric vehicle, the system comprising:
   a navigation device configured to receive an input that includes a destination and a parking/stopping time of the electric vehicle;
   a controller configured to:
      calculate a driving energy required for driving the electric vehicle to the destination and a first required energy for maintaining a refrigerating or freezing function to the destination; and
      determine in advance, based on a current battery state of charge (SOC) level, whether it is possible for the electric vehicle to be driven to the destination while consuming a total energy obtained by summing the driving energy and the first required energy; and
   a display device configured to display a result of the determination of whether it is possible for the electric vehicle to be driven to the destination while consuming the total energy,
   wherein the controller is further configured to:
      calculate a second required energy required for maintaining the refrigerating or freezing function in a state of the electric vehicle being parked/stopped during the input parking/stopping time input into the navigation device;
      determine an available parking/stopping time for which the electric vehicle is able to be parked/stopped while discharging the second required energy based on the current battery SOC level;
      control for displaying the available parking/stopping time on the display device;
      compare the input parking/stopping time with the available parking/stopping time; and
      in response to the input parking/stopping time being greater, output to the display device a command to re-input the parking/stopping time at a value no greater than the available parking/stopping time.

2. The system of claim 1, wherein, in response to a determination that it is not possible for the electric vehicle to be driven to the destination while consuming the driving energy and the first required energy, the controller is further configured to perform control for displaying a battery discharge energy limit warning on the display device and for displaying a charging station on the navigation device.

3. The system of claim 1, wherein, in response to a determination that it is possible for the electric vehicle to be driven to the destination while consuming the driving energy and the first required energy, the controller is further configured to perform control for displaying a message on the display device informing that it is possible for the electric vehicle to be driven to the destination at the current battery SOC level.

4. The system of claim 1, wherein the controller is configured to compare the input parking/stopping time with the available parking/stopping time and, in response to the available parking/stopping time being greater, output a message to the display device indicating that parking/stopping is possible during the input parking/stopping time.

5. The system of claim 1, wherein, in response to an actual parking/stopping time exceeding the available parking/stopping time, the controller is configured to output to the display device a warning message indicating that the battery SOC level may fall below a lower limit reference value.

6. The system of claim 1, wherein the display device comprises:
   a display mounted inside the electric vehicle; and
   a portable smart device.

7. A method for discharge energy management of an electric vehicle, the method comprising:
   confirming, by a controller, input of a destination of the electric vehicle into a navigation device;
   calculating, by the controller, a driving energy required for driving the electric vehicle to the destination and a first required energy for maintaining a refrigerating or freezing function to the destination;
   determining, by the controller, based on a current battery state of charge (SOC) level, whether it is possible for the electric vehicle to be driven to the destination while consuming a total energy obtained by summing the driving energy and the first required energy;
   controlling, by the controller, to display on a display device the determination of whether it is possible for the electric vehicle to be driven to the destination while consuming the total energy; and
   further comprising confirming, by the controller, input of a parking/stopping time of the electric vehicle into the navigation device,
   wherein, in a state of the electric vehicle being parked/stopped, the method further comprises:
      calculating, by the controller, a second required energy required for maintaining the refrigerating or freezing function during the input parking/stopping time input into the navigation device;
      determining, by the controller, an available parking/stopping time for which parking/stopping is possible while discharging the second required energy based on the current battery SOC level;
      controlling, by the controller, display of the available parking/stopping time on the display device and
      comparing, by the controller, the input parking/stopping time with the available parking/stopping time; and
      in response to the input parking/stopping time being greater than the available parking/stopping time, outputting to the display device, by the controller, a command to re-input the parking/stopping time at a value no greater than the available parking/stopping time.

8. The method of claim 7, wherein, in response to a determination that it is not possible for the electric vehicle to be driven to the destination while consuming the total energy, the method further comprises:
   controlling, by the controller, to display a battery discharge energy limit warning on the display device; and
   controlling, by the controller, to display a charging station on the navigation device.

9. The method of claim 7, wherein in response to a determination that it is possible for the electric vehicle to be driven to the destination while consuming the total energy, the method further comprises controlling, by the controller, to display on the display device a message informing that it is possible for the electric vehicle to be driven to the destination at the current battery SOC level.

10. The method of claim 7, wherein, in response to an actual parking/stopping time exceeding the available parking/stopping time, the method further comprises outputting to the display device, by the controller, a warning message indicating that the battery SOC level may fall below a lower limit reference value.

11. The method of claim 7, wherein the display device comprises:
   a display mounted inside the electric vehicle; and
   a portable smart device.

12. A method for discharge energy management of an electric vehicle, the method comprising:
   confirming, by a controller, input of a destination of the electric vehicle into a navigation device;
   calculating, by the controller, a driving energy required for driving the electric vehicle to the destination and a first required energy for maintaining a refrigerating or freezing function to the destination;
   determining, by the controller, based on a current battery state of charge (SOC) level, whether it is possible for the electric vehicle to be driven to the destination while consuming a total energy obtained by summing the driving energy and the first required energy;
   controlling, by the controller, to display on a display device the determination of whether it is possible for the electric vehicle to be driven to the destination while consuming the total energy;
   confirming, by the controller, input of a parking/stopping time of the electric vehicle into the navigation device, wherein, in a state of the electric vehicle being parked/stopped, the method further comprises:
      calculating, by the controller, a second required energy required for maintaining the refrigerating or freezing function during the input parking/stopping time input into the navigation device;
      determining, by the controller, an available parking/stopping time for which parking/stopping is possible while discharging the second required energy based on the current battery SOC level;
      controlling, by the controller, display of the available parking/stopping time on the display device;
      comparing, by the controller, the input parking/stopping time with the available parking/stopping time; and
      in response to the available parking/stopping time being greater than the input parking/stopping time, outputting to the display device, by the controller, a message indicating that the input parking/stopping time is appropriate.

13. A system for discharge energy management of an electric vehicle, the system comprising:
   a navigation device configured to receive an input of a destination of the electric vehicle;
   a controller configured to:
      calculate a driving energy required for driving the electric vehicle to the destination and a first required energy for maintaining a refrigerating or freezing function to the destination; and
      determine in advance, based on a current battery state of charge (SOC) level, whether it is possible for the electric vehicle to be driven to the destination while consuming a total energy obtained by summing the driving energy and the first required energy; and
   a display device configured to display a result of the determination of whether it is possible for the electric vehicle to be driven to the destination while consuming the total energy and
   wherein the controller is further configured to:
      calculate a second required energy required for maintaining the refrigerating or freezing function in a state of the electric vehicle being parked/stopped during the input parking/stopping time input into the navigation device;
      determine an available parking/stopping time for which the electric vehicle is able to be parked/stopped while discharging the second required energy based on the current battery SOC level;
      control for displaying the available parking/stopping time on the display device
      compare the input parking/stopping time with the available parking/stopping time; and
      in response to the input parking/stopping time being greater, output to the display device a command to re-input the parking/stopping time at a value no greater than the available parking/stopping time.

14. The system of claim 13, wherein:
   in response to a determination that it is not possible for the electric vehicle to be driven to the destination while consuming the driving energy and the first required energy, the controller is further configured to perform control for displaying a battery discharge energy limit warning on the display device and for displaying a charging station on the navigation device; and
   in response to a determination that it is possible for the electric vehicle to be driven to the destination while consuming the driving energy and the first required energy, the controller is further configured to perform control for displaying a message on the display device informing that it is possible for the electric vehicle to be driven to the destination at the current battery SOC level.

15. The system of claim 13, wherein the display device comprises:
   a display mounted inside the electric vehicle; and
   a portable smart device.

* * * * *